United States Patent [19]
Bishop

[11] 3,800,756
[45] Apr. 2, 1974

[54] SPARK TIMING CONTROL
[75] Inventor: Gerald B. Bishop, Dearborn, Mich.
[73] Assignee: Ford Motor Company, Dearborn, Mich.
[22] Filed: Feb. 24, 1972
[21] Appl. No.: 228,863

[52] U.S. Cl............................................. 123/117 A
[51] Int. Cl............................................... F02p 5/04
[58] Field of Search............... 123/117, 117.1, 146.5

[56] References Cited
UNITED STATES PATENTS
2,698,612  1/1955  Schaefer............................. 123/117
2,381,610  8/1945  Mallory.............................. 123/117.1
3,043,285  7/1962  Bettoni.............................. 123/117.1

Primary Examiner—Laurence M. Goodridge

[57] ABSTRACT

The engine spark timing system includes a carburetor spark port connected to a distributor servo actuator through a flow restriction to normally slowly advance the spark timing as a function of increases in spark port vacuum to control emissions; the timing system also includes a device for temporarily inducing a higher vacuum in the servo during initial rapid accelerative movement of the throttle valve to temporarily increase or advance the spark timing to prevent engine backfire, the device being operative by decreases in engine intake manifold vacuum from a stable condition.

10 Claims, 1 Drawing Figure

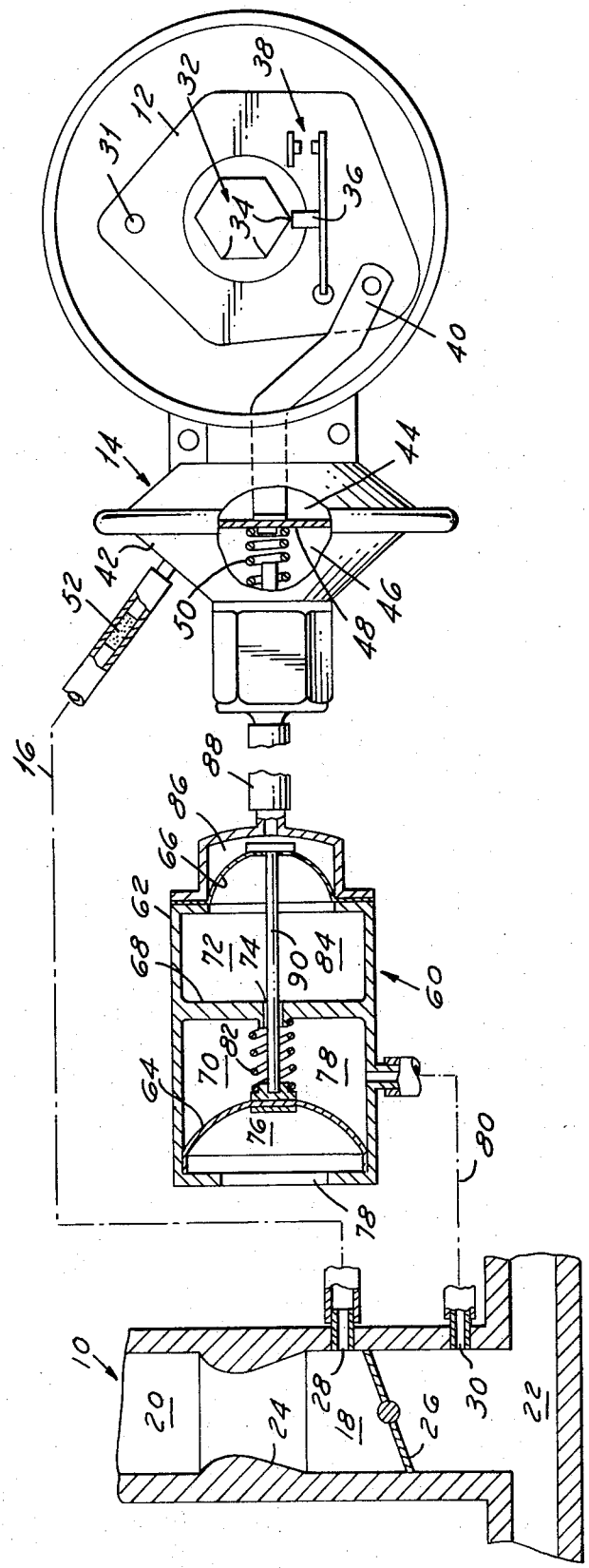

SPARK TIMING CONTROL

This invention relates, in general, to an engine spark timing control system. More particularly, it relates to one in which the spark timing is temporarily advanced during heavy acceleration modes of operation to prevent engine backfire.

As a rule, the engine spark timing systems in use today generally utilize the carburetor spark port vacuum to progressively advance the engine timing as a function of the opening movement of the throttle valve. A servo actuator strokes the distributor breaker plate in an advance direction upon application of spark port vacuum to it, or permits spring to stroke it in a retarded setting direction upon decrease in spark port vacuum upon closing of the throttle valve or upon fast opening of the throttle valve during acceleration operations. During the latter, retarding the spark advance will improve performance. However, it will also provide late burning of the mixture so that the exhaust port may contain a portion of the burning mixture. Because of valve overlap and the pressure pulsations that exist in the exhaust system, this portion of the burning mixture may be forced down the exhaust manifold channels to a cylinder also having open valves. Then it could pass through to the intake manifold where it could ignite the incoming charge, producing a backfire pressure wave pulsation that passes back to the carburetor.

Advancing the spark will ignite the mixture earlier and lengthen the burning time so that the burning mixture does not pass out into the exhaust port.

Accordingly, it is an object of this invention to momentarily advance the spark timing during initial heavy accelerative operation of the engine to increase the burning time to provide complete combustion within the engine and thereby prevent backfire.

It is another object of the invention to provide an engine spark timing control in which the initial acceleration phases of operation of the engine causes the manifold vacuum pressure decrease to temporarily induce a vacuum level in the distributor servo actuator that is higher than spark port vacuum and sufficient to advance the spark timing long enough to prevent backfiring until the spark port vacuum connected to the servo bleeds the induced vacuum to its level.

It is a further object of the invention to provide an engine spark timing control that normally advances and retards the spark timing solely as a function of changes in spark port vacuum, but temporarily advances the spark timing beyond a normal setting during acceleration modes of operation to prevent engine backfire; the spark timing being returned to control by spark port vacuum changes alone after a delay determined by flow restricting means placed in the line between the spark port and the distributor servo actuator.

Other objects, features and advantages of the invention will become more apparent upon reference to the succeeding detailed description thereof, and to the drawing illustrating schematically a cross-sectional view of an engine spark timing system embodying the invention.

The FIGURE shows, schematically, only those portions of an internal combustion engine that are normally associated with the engine distributor spark timing setting control; such as, for example, a carburetor 10, a distributor breaker plate 12, a vacuum servo 14 to control the movement of breaker plate 12, and a line 16 connected between the carburetor and vacuum servo to automatically change the engine spark timing setting as a function of changes in engine spark port vacuum.

More specifically, carburetor 10 is shown as being of the downdraft type having the usual air-fuel induction passage 18 with an atmospheric air inlet 20 at one end and connected to the engine intake manifold 22 at the opposite end. Passage 18 contains the usual fixed area venturi 24 and throttle valve 26. The latter is rotatably mounted on a part of the carburetor body across passage 18 in a manner to control the flow of air-fuel mixture into the intake manifold. Fuel would be inducted in the usual manner from a nozzle, not shown, projecting into or adjacent venturi 24, in a known manner.

Throttle valve 26 is shown in its engine idle speed position essentially closing induction passage 18, and is rotatable to a nearly vertical position essentially unblocking passage 18. A spark port 28 is provided at a point just above the idle position of throttle valve 26, to be traversed by the throttle valve during its part throttle opening movements. This will change the vacuum level in spark port 28 as a function of the rotative position of the throttle valve, the spark port reflecting essentially atmospheric pressure in the air inlet 20 upon closure of the throttle valve. An intake manifold vacuum sensing port 30 is also provided, for a purpose to be described.

As stated previously, the distributor includes a breaker plate 12 that is pivotally mounted at 31 on a stationary portion of the distributor, and movable with respect to cam 32. The latter has six peaks 34 corresponding to the number of engine cylinders. Each of the peaks cooperates with the follower 36 of a breaker point set 38 to make or break the spark connection in a known manner for each one-sixth, in this case, rotation of cam 32. Pivotal movement of breaker plate 12 in a counterclockwise spark retard setting direction, or in a clockwise spark advance setting, is provided by an actuator 40 slidably extending from vacuum servo 14.

Servo 14 may be of a conventional construction. It has a hollow housing 42 whose interior is divided by an annular flexible diaphragm 48 into an atmospheric pressure chamber 44 and a vacuum chamber 46. The diaphragm is fixedly secured to actuator 40, and is biased in a rightward retard direction by a compression spring 50. Chamber 44 has an atmospheric or ambient pressure vent, not shown, while chamber 46 is connected by a bore, not shown, to line 16. Line 16 contains a sintered metal orifice or flow restriction 52 of a known type, for a purpose to be described.

During engine-off and other operating conditions to be described, atmospheric exists on both sides of the diaphragm 48, permitting spring 50 to force the actuator 40 to the lowest advance or a retarded setting position. With the engine running, application of vacuum is slowly applied to chamber 46 to move diaphragm 48 and actuator 40 toward the left to an engine spark timing advance position, by degrees as a function of the change in vacuum level.

As stated previously, the timing system includes a device to temporarily induce a vacuum in the servo 14 during initial acceleration modes of operation to temporarily advance the spark timing.

More specifically, the device 60 includes a housing 62 containing two annular flexible diaphragms 64 and 66 at opposite ends. A partition member 68 divides the housing into two chambers 70 and 72 connected by a through port 74. The diaphragm 64 subdivides chamber 70 into an air chamber 76 connected to atmosphere or ambient pressure through a large opening 78 in the end of housing 62, and a manifold vacuum chamber 78. The latter is connected by a line 80 to the manifold vacuum port 30. Partition 68 also serves as a spring seat for a spring 82 normally biasing the diaphragm 64 to the left as seen in the figure.

The diaphragm 66 divides chamber 72 into a manifold vacuum chamber portion 84 and a variable volume chamber 86. Chamber 86 is connected by a conduit 88 into the servo chamber 46. The two diaphragms 66 and 64 are interconnected by a link 90, and the area of diaphragm 66 is less than that of diaphragm 64, for a purpose that will become clear later.

It will be seen that when the throttle valve is closed, the intake manifold vacuum acting in chambers 78 and 84 against the largest diaphragm 64 will overcome the force of spring 82 and move the diaphragms to the right to seat diaphragm 66 against the end of conduit 88. The force of spring 82 is chosen such that when the throttle valve is opened to a position indicating acceleration operation, the decrease in manifold vacuum (higher pressure) in port 30 reflected in chambers 78 and 84 permits spring 82 to stroke the diaphragm 64 and thus 66 to the left as shown in the figure. This will immediately increase the volume of chamber 86 and lower the pressure in line 88 and chamber 46 of servo 14. The flow restriction or orifice 52 in line 16 prevents immediate communication of the vacuum in spark port 28 to servo chamber 46. Accordingly, the vacuum induced in chamber 86 will immediately cause a stroking of the servo diaphragm to the left to advance the ignition timing.

The timing will remain advanced for a short period of say one second, for example, until the spark port vacuum present in line 16 is bled through the orifice 52 to decay the induced vacuum in chamber 46 to the spark port vacuum level. The higher pressure level in chamber 46 then will permit the spring to return the breaker plate to a less advanced or to a retarded setting comparable to one that is normally attained without the device of the invention. A subsequent buildup in manifold vacuum level will then cause a return movement of the diaphragms 64 and 66 to the right to their original stable positions compressing spring 82 to an equilibrium position.

The overall operation of the invention is believed to be clear from the above description and from a consideration of the drawing, and, therefore, will not be repeated in detail. Suffice it to say that vehicle accelerations from a closed throttle position will cause an initial temporary advance of the spark timing followed by a slow, less advanced timing as the spark port vacuum slowly increases. Decelerations of the engine by moving the throttle to a closed position will cause a delayed return to a retarded setting by virtue of the orifice in the spark port vacuum conduit to the servo.

The slow advance improves emissions by providing late burning. Th slow retard during decelerations permits a more rapid recovery to an advanced setting, upon reaccelerations, to improve fuel economy and performance.

While the invention has been shown and described in its preferred embodiment, it will be clear to those skilled in the art to which it pertains that many changes and modifications may be made thereto without departing from the scope of the invention.

I claim:

1. A spark timing control for an engine having a carburetor induction passage with a spark port above the idle speed position of the throttle valve, a distributor breaker plate spring biased in a spare timing retarded setting direction, vacuum servo means normally moving the breaker plate in an advanced timing direction as a function of increases in spark port vacuum applied thereto, conduit means connecting the spark port to the servo means, and control means responsive to accelerative opening movement of the throttle vale effecting one force level of vacuum at the spark port artificially momentarily providing a higher vacuum level force at the servo means establishing a predetermined engine advanced timing setting followed by a decay in the higher vacuum level force to the level at the spark port to establish a lower spark timing setting.

2. A spark timing control as in claim 1, the control means including flow restricting means in the conduit means delaying communication of changes in pressure levels between the spark port and servo means.

3. A spark timing control as in claim 2, the control means including second servo means operated by manifold vacuum and responsive to manifold vacuum decreases from a stable level to effect an advance movement of the breaker plate.

4. A spark timing control as in claim 2, the control means including manifold vacuum responsive means to induce a vacuum in the servo means upon initial opening accelerative movement of the throttle valve, the vacuum level induced advancing the spark timing setting until the induced vacuum is decayed by the bleed of spark port vacuum through the flow restricting means.

5. A spark timing control as in claim 2, including second servo means and second conduit means connecting the second and first mentioned servo means, further conduit means connecting the second servo means to an engine manifold vacuum port, spring means biasing the second servo means in one direction opposed by the manifold vacuum pressure, the second servo means being operative upon decrease in manifold vacuum upon opening of the throttle valve to increase the volume of the second conduit means thereby inducing the vacuum in the first mentioned servo means to temporarily advance the spark timing until the spark port vacuum is bled through the flow restricting means sufficient to decay the induced vacuum to thereby return the spark timing to the level called for the spark port vacuum.

6. A spark timing control as in claim 2, the control means including a second servo having a housing partitioned into a pair of first and second chambers by a flexible diaphragm, second conduit means connecting the first chamber to the servo means, other conduit means connecting the second chamber to an engine manifold vacuum port for moving the diaphragm in one direction in response to manifold vacuum applied thereto, and spring means biasing the diaphragm in the opposite direction whereby decreases in manifold vacuum below a stable level upon opening of the throttle valve permits the spring means to stroke the diaphragm in the opposite direction to momentarily induce a vacuum in the servo means sufficient to advance the spark setting until spark port vacuum bled through the flow restricting means decays the induced vacuum to the spark port level.

7. A spark timing as in claim 6, the second servo including a second diaphragm subjected to atmospheric pressure on one side and manifold vacuum on the opposite side and connected to the first mentioned diaphragm for moving the same at times.

8. A spark timing control as in claim 7, the spring means biasing the second diaphragm against the action of manifold vacuum.

9. A spark timing control as in claim 7, the second diaphragm having a greater area than the first mentioned diaphragm.

10. A spark control as in claim 2, the control means including a variable volume chamber connected to the servo means in a parallel relationship to the conduit means, and means responsive to manifold vacuum level decreases upon opening the throttle valve for increasing the volume of the chamber to induce a vacuum in the servo means sufficient to advance the spark timing until the spark port vacuum increase resulting from opening the throttle valve bled through the flow restricting means decays the induced vacuum to spark port level.

* * * * *